(No Model.)

T. D. BOTTOME.
ELECTRO CHEMICAL TRANSFORMER.

No. 458,652. Patented Sept. 1, 1891.

Witnesses
Daniel P. Griffith
Chas. H. Amor

Inventor
Turner D. Bottome

UNITED STATES PATENT OFFICE.

TURNER D. BOTTOME, OF HOOSICK, NEW YORK.

ELECTRO-CHEMICAL TRANSFORMER.

SPECIFICATION forming part of Letters Patent No. 458,652, dated September 1, 1891.

Application filed January 28, 1890. Serial No. 338,432. (No model.)

*To all whom it may concern:*

Be it known that I, TURNER D. BOTTOME, a citizen of the United States, and a resident of Hoosick, in the county of Rensselaer and State of New York, have invented certain new and useful Improvements in Electro-Chemical Transformers, of which the following is a specification.

This invention relates to the production of direct continuous electric currents from alternating currents without the use of magnetic devices or mechanically-moving apparatus.

The objects of the present invention are to provide a ready and simple means for transforming or commutating alternating electric currents into continuous or a current of one direction and to avoid the destructive sparking so commonly inherent, a defect in all mechanical transformers designed for this purpose.

Briefly, the invention consists in producing a device consisting of four asymmetrical conductors electrically connected together in such a manner that when alternating currents are passed through the device they are commutated or transformed, so that they are delivered from the said device in one direction only and of a continuous character, suitable for energizing electro-magnets or for electrolytic operations.

In more fully describing my invention reference may be had to the accompanying drawings, which serve to illustrate the invention and form a part of this specification, in which—

Figure 1:
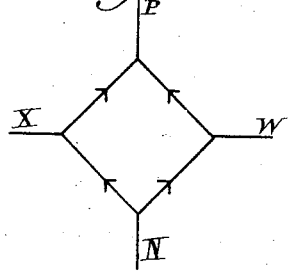
Figure 2:
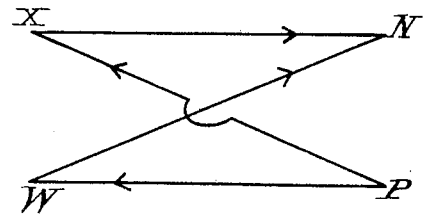
Figure 3:
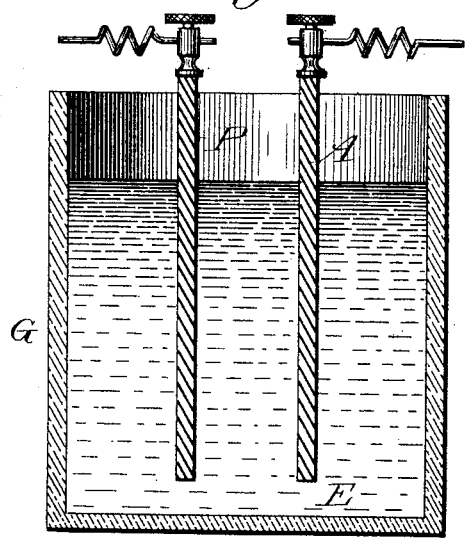
Figure 4:
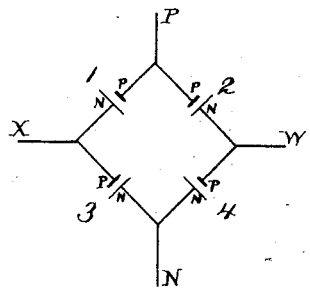
Figure 5:
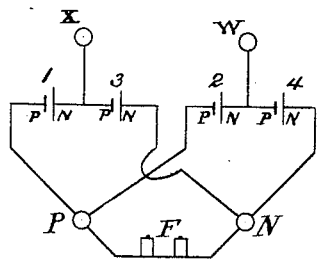

Figures 1 and 2 are diagrams of the invention in its simplest forms. Fig. 3 illustrates in detail one of the asymmetrical conductors. Figs. 4 and 5 show the electrical connections and the general disposition of asymmetrical conductors in the device.

In Figs. 1 and 2, X and W are the alternating-current terminals or poles, and P and N are the poles from which the continuous current is taken, while the arrows indicate the position of the asymmetrical conductors as well as the direction of the least resistance they offer to the electric current. It is thus seen that there is always a positive pole at P and a negative pole at N, irrespective of the direction in which the current enters the device at either X or W.

In Fig. 3 an insulating-vessel G is shown, which is filled with an electrolyte E, in which is immersed an electrode A and another electrode P. The electrode A consists of a plate or other form of metallic aluminum and is provided with an electric terminal or pole. The electrode P consists of some inoxidizable conducting element, such as platinum, carbon, gold, &c. The electrolyte E consists of a chemical mixture usually containing sulphuric acid in some form, either free acid or some compound containing a sulphate.

In Figs. 4 and 5 the device is shown complete in detail, X and W, as before, being the poles to which the alternating-current terminals are attached, and the poles P and N being the ones from which the continuous current is obtained.

The branches 1 2 3 4 indicate the asymmetrical conductors, each conductor having a $p$ pole and an $n$ pole and electrically connected in the manner shown. Thus starting at X the circuit divides, forming branches 1 and 3, the $n$ side of the asymmetrical conductor in branch 1 being nearest X, while the $p$ side of the asymmetrical conductor in branch 3 is nearest X. Branch 1 terminates to form the pole P, and branch 3 terminates to form the pole N. From the pole P to the pole W is branch 2, and from the pole N to pole W is branch 4, the $n$ side of branch 2 being nearest to the pole W. Thus the $p$ sides of the branches 1 and 2 are in connection with the pole P, and the $n$ sides of the branches 3 and 4 are in connection with the pole N. Now suppose that an electric current starts from X with a positive sign, (the pole W of course having a negative sign,) it follows branch 1 to P and branch 4 to N, because these branches offer the least resistance to the passage of the electric current (it being understood that P and N are electrically connected together by some device, such as an electro-magnet, for instance, as shown at F in Fig. 5) in that particular direction; but if, on the other hand, the electric current starts with a positive sign from the pole W, then the path of the least resistance would be from W to P and from N to X.

To apply the invention to practical uses and purposes, all that is necessary is to attach the terminals of a source of an alternating electric current to the poles X and W of the asymmetrical transformer and to attach the poles P and N of the transformer to the device or apparatus requiring a continuous electric current, such as the field-magnets of an alternator or the electrodes of an electroplating or electrotyping bath. By such means I have found that alternators may be made self-exciting, thus dispensing with the usual separate continuous-current dynamo heretofore used for energizing the fields.

There may be other methods in which asymmetrical conductors may be connected or combined to form a device capable to transform an alternating into a continuous current; but the method I have shown is simple and effective, yet I do not limit myself to the particular method herein shown, as any other method of connecting more than one asymmetrical conductor together, so as to form a device that transforms an alternating current into a continuous one, will serve my purpose.

What I claim as my invention is as follows:

1. An electro-chemical transformer consisting in a device composed of four chemical asymmetrical resistances having electrodes electro-chemically adapted and electrically connected together in such a manner that when an alternating electric current is passed through the device it is transformed into a continuous current of one direction, as described.

2. An electro-chemical transformer consisting of four asymmetrical conductors, each conductor consisting of an insulating containing-vessel filled with an electrolyte composed of sulphuric acid or a sulphate in which is immersed an electrode of some inoxidizable conducting element forming one pole and another electrode of aluminum forming the other pole, the two poles of each of the four conductors being electrically connected together, so that electric currents of one direction can only pass through two of the conductors, while currents of an opposite direction can only pass through the other two conductors, both currents being so deflected that they join at common poles to form a unidirection current, substantially as shown and described.

Signed at Hoosick, in the county of Rensselaer and State of New York, this 25th day of January, A. D. 1890.

TURNER D. BOTTOME.

Witnesses:
D. V. JONES,
GEO. H. MYERS.